E. FLUKE.
COMBINATION SWITCH.
APPLICATION FILED APR. 10, 1919.
1,320,042.
Patented Oct. 28, 1919.
Fig. 1.
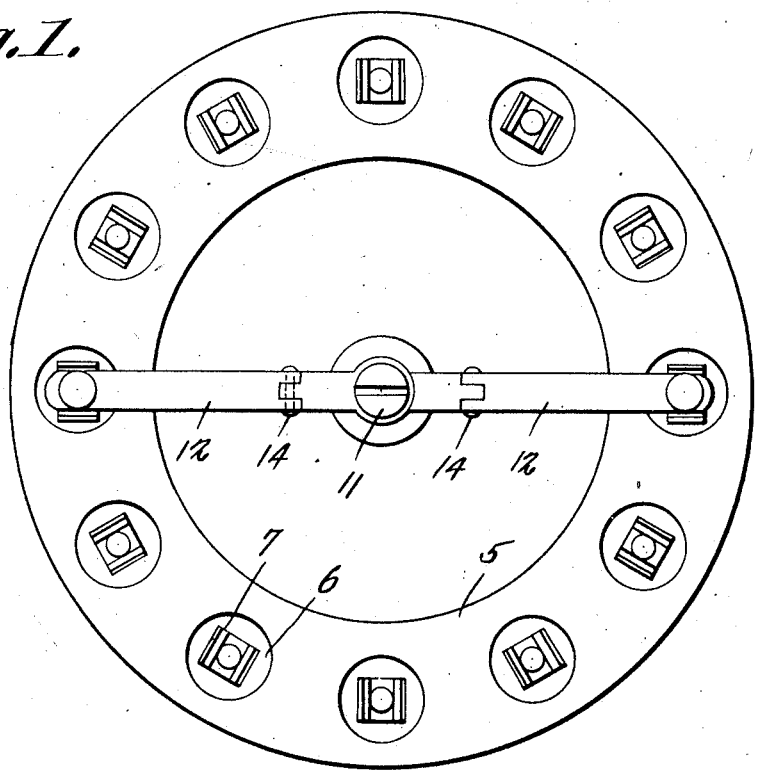
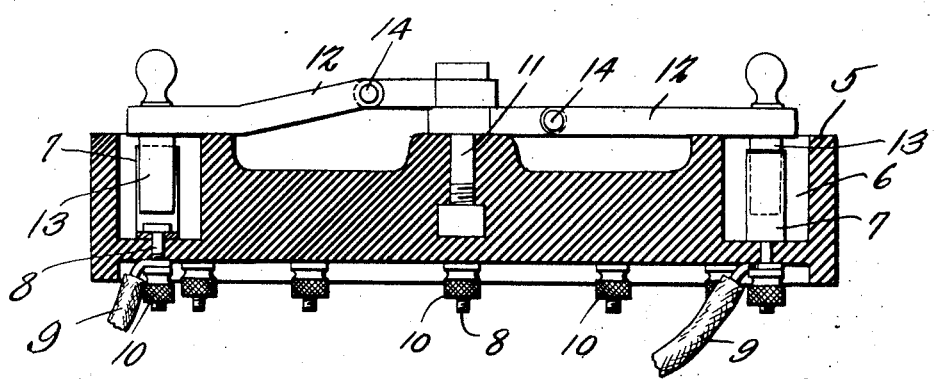
Fig. 2.
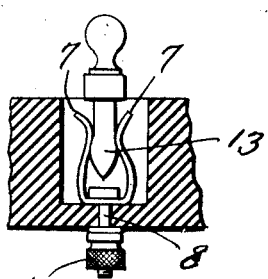
Fig. 3.
Witness
F. B. Wooden.
Inventor,
Eley Fluke
By C A Snow & Co.
Attorneys.

UNITED STATES PATENT OFFICE.

ELEY FLUKE, OF INDEPENDENCE, OREGON.

COMBINATION-SWITCH.

1,320,042.   Specification of Letters Patent.   Patented Oct. 28, 1919.

Application filed April 10, 1919. Serial No. 289,019.

*To all whom it may concern:*

Be it known that I, ELEY FLUKE, a citizen of the United States, residing at Independence, in the county of Polk and State of Oregon, have invented a new and useful Combination-Switch, of which the following is a specification.

The present invention relates to electric switches for automobiles, the principal object being to provide a combination switch which will prevent an unauthorized person starting the automobile.

Another object of the invention is to provide a switch for preventing the theft of the automobile and which may be used in connection with any ignition and lighting system installed in any automobile.

An additional object of the invention is to provide a switch for controlling the electrical system of automobiles which is simple in construction, consists of few parts, and which may be manufactured at a minimum cost.

With the above and other objects and advantages in view the invention consists of combinations, constructions, arrangement of parts, specific details, and general assemblage which will be fully amplified in the following disclosure and illustrated in the accompanying drawings, wherein:

Figure 1 is a top elevation of the switch;

Fig. 2 is a vertical cross sectional view of the same;

Fig. 3 is a fragmentary view showing one pair of the spring arms engaged with one of the movable circuit closers.

Referring to the drawing the numeral 5 designates a disk which is adapted to be mounted upon the dash board of an automobile and is provided with the radially disposed openings 6 which are reduced at one end and extend entirely through the disk.

Disposed within the openings 6 are pairs of oppositely curved spring arms 7 which are held in place by screws 8 that are disposed in the reduced end of the openings 6 and project out of the same. Any pair of these screws are adapted to be electrically connected with the conductors 9 that are in circuit with the ignition system of the automobile. Nuts 10 are then threaded upon the ends of these screws 8.

Pivoted upon the upper face of the disk 5, as at 11, is a pair of circuit closing hands 12 which are adapted to be moved around the disk 5 and register with any of the openings 6. These members 12 are provided with down-turned lugs or heads 13 which are engageable in the spring arms 7 and complete the electrical circuit. Each of the contacts 12 is provided with a hinge joint 14 that permits the end of the same being swung in a vertical plane to disengage the lugs from the spring clamps.

From the above it will be seen that a person not knowing which clamps are in circuit with the conductor 9 will be unable to complete the circuit to start the engine. It will also be seen that the conductors may be connected with any of the screws 8 to change the combination of the switch.

This embodiment of the invention is considered the preferred construction, but it is to be understood that the invention is susceptible of various modifications and that my limits of modification are only governed by the appended claims.

Claims—

1. A circuit closer comprising a disk of non-conducting material of relatively great thickness and provided with recesses in one face thereof, a pair of outstanding resilient contacts mounted in each of the recesses, a plurality of movable contact arms having their inner ends pivotally connected to a common axis upon said face, and a contact point depending from the free end of each of the movable contact arms and engageable with any pair of the resilient contacts to complete an electric circuit.

2. A circuit closer comprising a disk having radially disposed openings therein which are reduced at one end, a pair of oppositely curved spring arms mounted in each of the openings, a screw securing each pair of spring arms in place, certain of the screws being connected with an electrical supply, a pair of hands pivoted upon the disk and movable therearound, lugs carried by the hands engageable with the spring arms, and a hinge joint in each of the hands to permit the lugs to be disengaged from the spring arms.

In testimony that I claim the foregoing as my own, I have hereto affixed my signature in the presence of two witnesses.

ELEY FLUKE.

Witnesses:
E. M. JORDAN,
B. F. SWOPE.